United States Patent [19]

Ciullo

[11] 4,302,253
[45] Nov. 24, 1981

[54] THICKENERS FOR ACID CLEANING COMPOSITIONS

[75] Inventor: Peter A. Ciullo, Naugatuck, Conn.

[73] Assignee: R. T. Vanderbilt Company, Inc., Norwalk, Conn.

[21] Appl. No.: 122,393

[22] Filed: Feb. 19, 1980

[51] Int. Cl.$^3$ .............................................. C08L 5/100
[52] U.S. Cl. ................... 106/208; 106/209; 252/100; 252/102
[58] Field of Search ............... 252/102, 100, 106, 542; 106/205, 206, 208, 209, 3, 5

[56] References Cited

U.S. PATENT DOCUMENTS

| | | | |
|---|---|---|---|
| 2,672,449 | 3/1954 | Snell et al. | 252/100 |
| 2,957,823 | 10/1960 | Newcombe et al. | 252/8.55 |
| 3,169,905 | 2/1965 | Lambert et al. | 424/357 |
| 3,231,580 | 1/1966 | Mannheimer | 252/542 |
| 3,325,415 | 6/1967 | Kenney | 252/144 |
| 3,468,904 | 9/1969 | Kritchevsky | 260/309.6 |
| 3,733,277 | 5/1973 | Wooden et al. | 252/106 |
| 3,966,432 | 6/1976 | Rayner | 106/3 |
| 3,997,460 | 12/1976 | Sirine et al. | 252/106 |
| 3,998,973 | 12/1976 | Carlson | 424/357 |
| 4,051,055 | 9/1977 | Trinh | 252/95 |

FOREIGN PATENT DOCUMENTS 684382 11/1968 South Africa .

OTHER PUBLICATIONS

Chem. Abst. 82: 75, 289C; 60,535F
Chem. Abst. 84: 76; 174 Q.
Chem. Abst. 86: 77421 W.
Desmond, H., Toilet Bowl Cleaners, *Soap, Perfum, Cosmetic*, 1977 50(10), 426–428.
Flick, Ernest W., *Household & Automotive Chemical Specialities*, pp. 270–272, Mar. 1979.

Primary Examiner—Allan Lieberman
Assistant Examiner—Pat Short
Attorney, Agent, or Firm—Rasma B. Balodis

[57] ABSTRACT

This invention relates to storage stable liquid cleaning compositions for use on porcelain type surfaces wherein said compositions comprise an aqueous mineral acid solution thickened with smectite clay and xanthan gum, a stabilizing amount of 1-hydroxyethyl-2-alkylimidazoline and optionally, a chelate. The compositions may further contain a disinfectant.

9 Claims, No Drawings

THICKENERS FOR ACID CLEANING COMPOSITIONS

This invention relates to thickening compositions and to acid cleaning compositions containing same.

Liquid acid cleaning compositions are well known in the art. These cleaners are particularly useful in removing inorganic and organic stains and discolorations from porcelain surfaces difficult to clean such as toilet bowls, sinks and similar fixtures with vertical and curved surfaces. Acid cleaners are generally thickened to a viscous consistency for greater cleaning efficiency and safer handling. The ability of the cleaner to adhere to vertical and curved surfaces, that is, at the place of application accounts for efficient and rapid stain removal and improved cleaning action as compared to unthickened compositions. Furthermore, the cleaning agent should impart cleaning action without damaging the surface of the porcelain fixture. Another requirement is that the cleaning compositions retain their initial viscosity during their shelf life.

Smectite clays of the swellable type are well known thickeners for aqueous systems described in U.S. Pat. No. 3,998,973 to Carlson. Their smoothness and non-abrasive character render smectites desirable for use in cleaners of surfaces that can be easily marred as for example porcelain and the like. However, swellable smectites are incompatible with acid systems and form unstable suspensions which lose their initial viscosity upon standing. As a result, syneresis develops. This phenomenon is due to ion exchange reaction between the smectite clay and the acid. Metal ions, particularly sodium ions associated with the smectite are exchanged for the acid hydrogen ion. The produced hydrogen form of the smectite has poor colloidal properties resulting in gross flocculation and subsequent syneresis.

It has been now discovered that flocculation of smectite in acid systems can be prevented by addition of 1-hydroxyethyl-2-alkylimidazolines. Although we do not wish to be bound by a specific hypothesis, presumably, the imidazoline is converted to a water soluble cationic salt in highly acidic systems. The imidazoline salt preferentially associates with the smectite either by substitution of the sodium ion of the smectite or by another mechanism to prevent the clay from gross flocculation in the presence of high hydrogen ion concentration. The action between the smectite and the imidazoline salt is further enhanced in the presence of a chelate.

The imidazoline treatment leaves the smectite free to function as a thickening agent. However, the imidazoline-modified smectite has reduced thickening efficiency. Thus, it is desirable to add another thickening agent to the acid system, preferably one which is acid-stable.

Among the natural and synthetic polymeric thickeners, xanthan gum has relatively high resistance to degradation at low pH. However, acid systems thickened with xanthan gum lose their initial viscosity upon storage and have a short shelf life.

Surprisingly, a synergistic thickening effect occurs when xanthan gum is combined with the imidazoline treated smectite in certain proportions. The resulting compositions retain their initial viscosity for long periods of time and display good cleaning action.

SUMMARY OF THE INVENTION

The invention concerns a synergistic thickening agent comprising (a) swellable smectite clay, (b) xanthan gum and (c) imidazolines of the structural formula

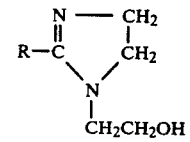

wherein R represents $C_{7-17}$ alkyl radical derived from fatty acids and the ratio of the smectite to xanthan gum is about 9:1 to about 1:1 and the ratio of the smectite to the imidazoline is about 9:1 to about 1:2. Another aspect of the invention relates to a storage stable liquid cleaning composition comprising (a) up to about 30 percent by weight of mineral acid;
(b) about 1 to about 5 percent by weight of synergistic thickening agent comprising swellable smectite clay, xanthan gum and 1-hydroxyethyl-2-alkylimidazolines derived from fatty acids wherein the ratio of the smectite to the xanthan gum is about 9:1 to about 1:1 and the ratio of smectite to the imidazoline about 9:1 to about 1:2;
(c) remainder water.

In a preferred embodiment of the invention, the cleaner may further contain an effective amount of disinfectant.

Another object of the invention is to provide a method of thickening acid cleaning compositions the steps of which comprise:

(a) adding a dry blend of swellable smectite clay and xanthan gum to water;
(b) hydrating by mixing;
(c) adding 1-hydroxyethyl-2-alkylimidazolines derived from fatty acids;
(d) dispersing the imidazoline under low shear conditions; and
(e) blending in mineral acid to produce a viscous liquid.

Optionally, the imidazoline may be dispersed in the presence of a chelate.

DETAILED DESCRIPTION OF THE INVENTION

The main criteria for acceptable acid cleaners are stability of viscosity, minimal discoloration upon aging and retention of homogeneity essential for smooth pour from the dispenser with minimal or no agitation of the container. For the instant cleaners a viscosity of about 300 to 1000 centipoises is preferable for a balance of good flow with good adhesion to vertical and curved surfaces.

According to the invention, cleaners with the desired characteristics are provided by thickening mineral acids with a synergistic thickening agent composed of smectite clay, xanthan gum and 1-hydroxyethyl-2-alkylimidazoline in certain proportions.

The acid component of the cleaner composition is a strong mineral acid, preferably hydrochloric, sulfuric, phosphoric acid and the like. The concentration of the acid may vary depending on the type of cleaner and the intended use. The lower limit of the acid should be sufficient to effect a cleaning action and may be as low as 3 percent. The upper limit for a cleaner is about 30 percent, and preferably about 20 percent. The preferred smectite clays are of the swellable or expandable type.

The structure of these clays is such that water and other polar molecules including certain organic molecules can enter between the unit layers of the lattice thus causing the lattice to expand. Consequently, a swelling effect occurs and the viscosity of the liquid system is increased. In the presence of strong acids, the structure collapses and the viscosity of the dispersion is reduced.

According to the invention, the collapse of the clay structure can be prevented by treatment with 1-hydroxyethyl-2-alkylimidazoline. Although water-soluble salts offer some protection, water-insoluble imidazolines are preferred.

Acid reacts preferentially with these imidazolines to form cationic salts which in turn associate with the smectite to afford protection against the acid. Preffered are 1-hydroxyethyl-2-alkylimidazolines derived from fatty acids, particularly tall oil, caprylic, and oleic acid. The imidazolines can be prepared by condensation of fatty acids with amines by known methods described in U.S. Pat. No. 3,468,904 to Kritchevsky (incorporated herein by reference).

Imidazoline should be added in sufficient amount to effect base exchange with the cationic imidazoline salt and thus, adequately protect the smectite from acid attack. A smectite to imidazoline ratio of about 3:1 theoretically provides for complete ion exchange. However, a partial exchange is satisfactory for preventing flocculation of the smectite. The ratio of smectite to imidazoline may range from as low as about 9:1 to about 2:1. The preferred ratio is about 1:1. Excess imidazoline present in free form, i.e., not tied up by the smectite will function as a surfactant for improved cleaning efficacy, but will not contribute to the stability of the cleaning composition.

The xanthan gum component displays synergism with the imidazoline-treated smectite in acid systems when added in the ratio of about 9:1 to about 1:1 smectite to xanthan gum. The preferred ratio of smectite to xanthan gum is about 2:1.

The synergistic thickener is added in an amount sufficient to produce the desired thickening effect. For the present cleaners the thickener is added in the amount of about 1 percent to about 5 percent.

Optionally, the cleaning composition may contain a germicide in an amount effective to impart a disinfecting action. The preferrred germicides are alkyldimethylbenzylammonium chlorides which display good stability in acid systems. They also function as surfactants for added cleaning action. These quaternary ammonium salts display good compatibility with the imidazoline-treated clay of the invention. Particularly preferred are mixed $C_{12-16}$ alkyldimethylbenzylammonium chlorides.

Other known ingredients such as perfume, dyes, and the like may be added to the cleaning composition.

The cleaning composition can be adapted for heavy duty use by adding an abrasive within the scope of the invention. In this case, the thickening agent will also act as a suspending agent for the abrasive.

The cleaning agent is prepared by blending a dry mixture of smectite and xanthan gum with water to effect hydration under low or high shear conditions. The latter is preferred because hydration will proceed at a faster rate. After hydration, imidazoline and then acid are admixed under low shear to produce a viscous solution.

Preferably, the thickening process may be conducted in the presence of the chelate, tetrasodium salt of ethylenediaminetetraacetic acid ($Na_4EDTA$). The chelate facilitates dispersion of the insoluble imidazoline and improves the overall efficiency of subsequent acidification and ion exchange reactions.

The following examples are given for the purpose of illustrating the invention and are not intended in any way to limit the invention. All percentages and parts are based on weight unless otherwise indicated.

EXAMPLE I

A series of control compositions were prepared by the procedure given hereinbelow and compared to a composition of the invention.

Smectite clay and/or xanthan gum, was added to water and the mixture was blended in a Waring Blendor under high shear. After hydration, the shear was reduced to minimize air entrapment and, in the order indicated, $Na_4EDTA$ chelate, imidazoline, concentrated hydrochloric acid and disinfectant were added separately with mixing after each addition until smooth and uniform. The disinfectant used is 80% $C_{12-16}$ alkyldimethylbenzylammonium chloride in ethanol.

Brookfield viscosity of the compositions was determined with Brookfield LVT instrument using a single point spindle at 60 rpm. The dates are given in Table I below. Upon storage up to one day, compositions 1 to 4 containing the individual components of the present thickening system showed phase separation and inability to maintain a stable, homogenous dispersion. Composition 5 thickened according to the invention retained its stability after 8 months of storage. The stability of composition 5 is due to synergism between the imidazoline-treated smectite and xanthan gum.

TABLE I

| Composition, percent | 1 | 2 | 3 | 4 | 5 |
| --- | --- | --- | --- | --- | --- |
| Swellable smectite[1] | 0.90 | — | — | 0.90 | 0.90 |
| Xanthan gum | — | 0.45 | — | 0.45 | 0.45 |
| Water | 75.85 | 76.30 | 76.75 | 78.65 | 75.40 |
| $Na_4EDTA$ | 1.00 | 1.00 | 1.00 | — | 1.00 |
| 1-Hydroxyethyl-2-alkylimidazoline | 1.00 | 1.00 | 1.00 | — | 1.00 |
| Hydrochloric acid (37%) | 20.00 | 20.00 | 20.00 | 20.00 | 20.00 |
| Alkyldimethylbenzylammonium chloride[2] | 1.25 | 1.25 | 1.25 | — | 1.25 |
| Physical Properties | | | | | |
| Initial viscosity, cps. | 120 | 387.5 | 4 | flocced | 470 |
| Appearance after 1 day | settling | phase separation | phase separation | — | smooth |

TABLE I-continued

| Composition, percent | 1 | 2 | 3 | 4 | 5 |
|---|---|---|---|---|---|
| after 8 months | — | — | — | — | smooth |

[1]VEEGUM manufactured by R. T. Vanderbilt Company, Inc.
[2]Barquat MB80 manufactured by Lonza, Inc.

EXAMPLE II

The procedure of Example I was repeated using varying amounts of the instant synergistic thickening agent given in Table II below. The imidazoline used is 1-hydroxyethyl-2-alkylimidazoline derived from oleic acid. All compositions have pH of about 0.5.

The data indicate that compositions thickened according to the invention retain their smooth, homogeneous structure and pour characteristics for long periods of time.

Composition 10 had a slightly grainy structure, but retained its pourability and uniformity without appearance of syneresis. Composition 6 retained its smooth structure even after extended storage for eight months.

EXAMPLE III

Sulfuric acid and phosphoric acid based compositions were prepared according to the method described in Example I. The ingredients and test data are compiled in Table III below. The imidazolines used are 1-hydroxyethyl-2-alkylimidazolines derived from tall oil and caprylic acid.

After three month storage, the compositions retained their smooth, uniform structure and pourability.

TABLE II

| Composition, percent | 6 | 7 | 8 | 9 | 10 |
|---|---|---|---|---|---|
| Swellable smectite | 0.90 | 0.90 | 1.80 | 0.90 | 0.90 |
| Xanthan gum | 0.45 | 0.45 | 0.20 | 0.45 | 0.45 |
| Water | 75.40 | 76.65 | 73.75 | 77.55 | 75.85 |
| Na$_4$EDTA | 1.00 | 1.00 | 1.00 | 1.00 | 1.00 |
| 1-Hydroxyethyl-2-alkylimidazoline | 1.00 | 1.00 | 2.00 | 0.10 | 1.80 |
| Hydrochloric acid (37%) | 20.00 | 20.00 | 20.00 | 20.00 | 20.00 |
| Alkyldimethylbenzylammonium chloride | 1.25 | — | 1.25 | — | — |
| Physical properties | | | | | |
| Viscosity, cps., initial | 470 | 570 | 280 | 570 | 760 |
| 1 day | 630 | 540 | 460 | 880 | 880 |
| 1 month | 700 | 540 | 550 | 850 | 910 |
| 3 months | 800[1] | 520 | 600 | 720 | 1200 |
| Discoloration after 3 months | Light[1] Yellow | Pale Yellow | Pale Yellow | Light Yellow | Pale Yellow |
| Appearance after 3 months | Smooth[1] | Smooth | Smooth | Smooth | Smooth Pour, slightly grainy |

[1]after 8 month storage

TABLE III

| Composition, percent | 11 | 12 |
|---|---|---|
| Swellable smectite | 0.90 | 0.90 |
| Xanthan gum | 0.45 | 0.45 |
| Water | 76.75 | 76.75 |
| Na$_4$EDTA | 1.00 | 1.00 |
| Imidazoline, tall oil derivative | 0.90 | — |
| Imidazoline, caprylic acid derivative | — | 0.90 |
| Sulfuric acid (96%) | 20.00 | — |
| Phosphoric acid (86%) | — | 20.00 |
| Physical properties | | |
| Viscosity, cps. initial | 540 | 640 |
| 1 day | 600 | 720 |
| 1 month | 590 | 760 |
| 3 months | 660 | 740 |
| Discoloration after 3 months | Light tan | None |
| Appearance after 3 months | Smooth | Smooth |

What is claimed is:

1. A synergistic thickening composition comprising (a) swellable smectite clay, (b) xanthan gum and (c) imidazolines of the structural formula

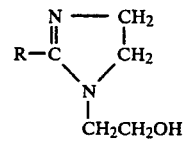

wherein R represents C$_{7-17}$-alkyl radical derived from fatty acids and the ratio of the smectite to xanthan gum is about 9:1 to about 1:1 and the ratio of the smectite to the imidazoline about 9:1 to about 1:2.

2. A method of thickening acid cleaning compositions the steps of which comprise:
   (a) adding a dry blend of swellable smectite clay and xanthan gum to water;
   (b) hydrating by mixing;
   (c) adding imidazoline of the structural formula

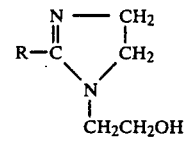

wherein R represents C$_{7-17}$-alkyl radical derived from fatty acids;
   (d) dispersing the imidazoline under low shear conditions;
   (e) blending in mineral acid to produce a viscous liquid.

3. A method according to claim 2 wherein the imidazoline is dispersed in the presence of tetrasodium salt of ethylenediaminetetraacetic acid.

4. A liquid cleaning composition comprising
   (a) up to about 30 percent by weight of mineral acid;
   (b) a thickening agent consisting of (i) swellable smectite clay;
(ii) xanthan gum; and
(iii) imidazolines of the structural formula

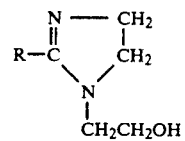

wherein R represents $C_{7-17}$-alkyl radical derived from fatty acids and wherein the ratio of the smectite to xanthan gum is about 9:1 to about 1:1 and the ratio of the smectite to the imidazoline about 9:1 to about 1:2 in an effective amount; and (c) water.

5. A composition according to claim 4 wherein the imidazoline is substituted by alkyl radical derived from oleic acid.

6. A composition according to claim 4 wherein the imidazoline is substituted by alkyl radical derived from tall oil.

7. A composition according to claim 4 wherein the imidazoline is substituted by alkyl radical derived from caprylic acid.

8. A composition according to claim 4 which further contains a disinfectant.

9. A composition according to claim 4 wherein the mineral acid is hydrochloric acid.

* * * * *

UNITED STATES PATENT AND TRADEMARK OFFICE
CERTIFICATE OF CORRECTION

PATENT NO. : 4,302,253

DATED : November 24, 1981

INVENTOR(S) : Peter A. Ciullo

It is certified that error appears in the above-identified patent and that said Letters Patent are hereby corrected as shown below:

Column 3, line 34, "2:1" should read -- 1:2 --;

Colum 6, line 9, "comprising" should read -- consisting of --.

Signed and Sealed this

Twenty-third Day of March 1982

[SEAL]

Attest:

GERALD J. MOSSINGHOFF

Attesting Officer

Commissioner of Patents and Trademarks